United States Patent
D'Silva et al.

(10) Patent No.: US 7,718,220 B2
(45) Date of Patent: May 18, 2010

(54) METHOD AND SYSTEM FOR FORMING REINFORCING FIBERS AND REINFORCING FIBERS HAVING PARTICULATE PROTUBERANCES DIRECTLY ATTACHED TO THE SURFACES

(75) Inventors: Sean Charles D'Silva, Englewood, CO (US); Thomas E. Burghardt, Parker, CO (US)

(73) Assignee: Johns Manville, Denver, CO (US)

( * ) Notice: Subject to any disclaimer, the term of this patent is extended or adjusted under 35 U.S.C. 154(b) by 270 days.

(21) Appl. No.: 11/810,419

(22) Filed: Jun. 5, 2007

(65) Prior Publication Data

US 2008/0305329 A1    Dec. 11, 2008

(51) Int. Cl.
*B05D 1/12* (2006.01)
(52) U.S. Cl. ....................................... 427/180; 427/202
(58) Field of Classification Search ................. 427/180, 427/202
See application file for complete search history.

(56) References Cited

U.S. PATENT DOCUMENTS

| | | | | | |
|---|---|---|---|---|---|
| 2,491,889 | A | * | 12/1949 | Bennett et al. | 65/529 |
| 2,988,469 | A | * | 6/1961 | Watson | 264/6 |
| 4,526,733 | A | * | 7/1985 | Lau | 264/12 |
| 4,797,318 | A | * | 1/1989 | Brooker et al. | 442/344 |

FOREIGN PATENT DOCUMENTS

EP           0 156 160      * 11/1982

* cited by examiner

*Primary Examiner*—Frederick J Parker
(74) *Attorney, Agent, or Firm*—Robert D. Touslee

(57) ABSTRACT

Reinforcing fibers with small particles having a longest average dimension of approximately 0.01 nanometer to approximately 30 micrometers physically and/or chemically bonded directly to their surfaces to form protuberances thereon and a method and system for making these modified fibers are disclosed. The particles directly bonded to the surfaces of the fibers, serve to enhance physical properties of composite articles which incorporate such fibers as reinforcement.

14 Claims, 3 Drawing Sheets

METHOD AND SYSTEM FOR FORMING REINFORCING FIBERS AND REINFORCING FIBERS HAVING PARTICULATE PROTUBERANCES DIRECTLY ATTACHED TO THE SURFACES

This invention includes a method and system for forming reinforcing fibers having particulate protuberances directly attached to the surfaces thereof that render such fibers well suited for incorporation in a matrix material to form a fiber reinforced composite article. The resulted fibers can be used to form fiber reinforced products (FRP) or long fiber reinforced products (LFRP) having one or more of improved physical properties, lower cost, better fiber dispersion, better fiber adherence to the matrix material, improved appearance, fewer defects, particularly surface defects, and better uniformity including surface uniformity.

BACKGROUND OF THE INVENTION

It has long been known to make reinforcing fibers of glass, ceramics, carbon and certain polymers such as aromatic polyamides, etc. It has also long been known to coat the fibers with a sizing composition that protects the surfaces of the fibers against abrasive damage and enhances the bonding of a polymer or other matrix to the surface of the reinforcing fibers. The bond strength between the matrix and the surface of the fibers is extremely important for the physical properties of the composite materials since the strength of the reinforcing fibers is almost always significantly greater than the strength of the matrix material. Once the bond between the matrix and the surface of the reinforcing fiber is broken, the matrix can slip away from the fiber thereby causing strain or failure of the composite product. Since the bonding of the matrix to the surface of the fiber depends largely on the area of the fiber surface, increasing the surface area will also enhance the bond strength between the matrix and the reinforcing fiber. Reducing the diameter of the reinforcing fibers increases its surface area, but also increases costs and makes the manufacturing and processing more difficult. To further enhance bonding to a surface it is known to nano-roughen the surface of a substrate using a laser as disclosed in U.S. Pat. No. 6,350,506. To increase the surface area of reinforcing fibers it has also been proposed to etch or make nano-sized depressions in the surface of the fibers as disclosed in COMPOSITES SCI. TECH., 2006, Vol. 66, p. 509.

Chopped strand reinforced products, such as chopped strand for thermoset or thermoplastic resins, usually comprises glass fibers and can also comprise carbon, ceramic or polymer fibers, alone or in combination. These products are typically made from pellets or other forms, of one or a mixture of polymers having the fibers dispersed therein. These pellets, etc., are typically made by feeding bundles of fibers containing up to several thousand fibers, typically having a length of less than approximately 3 mm to about 7 mm or even up to approximately 250 mm, into a compounding or extruding machine along with one or more polymers and heating with high shear mixing to plasticize the polymer(s) and disperse the fibers therein. The current technology for long fibers includes feeding of the strands of fibers into molten polymer or other material matrix material, followed by cutting and compression molding.

Fiber products used to make FRP typically have a sizing that normally contains a coupling agent such as one or more silanes and one or more film formers or binders, and can contain other ingredients such as lubricants, surfactants, dispersants, fillers, stabilizers, antioxidants, biocides, and others that are needed or preferred for particular applications. The sizing is usually applied to the fibers as an aqueous slurry, solution, or emulsion, but liquids other than water may also be used. The amount and type of bonding agent(s) used in the sizing on the fibers results in stronger fiber-to-fiber bonding in the bundles. This aids the fiber handling characteristics, but may not be good for later processing and may affect the final product characteristics. To achieve good feeding characteristics in the fiber bundles, important to the final users, a substantial amount of film former or binding agent commonly is used in the sizing composition that is coated on each fiber to prevent filamentation during storage, shipment and handling. Filamentation, the breaking down of the fiber bundles resulting in excessive small fiber bundles and individual fibers in the product, causes bridging in the feeding bin cones, and other fiber handling equipment resulting in costly scrap and downtime.

Once in the compounder and in contact with the polymer(s), it is desirable that the bundles separate into individual fibers and that the fibers disperse thoroughly in the polymer(s). The time and amount of mixing action to accomplish this has a practical limit, and because of the strength of the bonds between the fibers, high-shear mixing commonly is required to achieve an acceptable degree of fiber dispersion and wet out (coating of the fibers with the polymer or polymer mixture). This shear damages the fiber surface and breaks the fibers into shorter segments, and commonly still falls short of optimum fiber dispersion. As a result, the produced reinforced plastic parts commonly do not reach their full potential with respect to surface characteristics and physical properties. Most product and process development work in this area is aimed at addressing these problems and opportunities.

Potential cost reduction opportunities exist in the chopped fiber bundle manufacturing processes by preparation of fibers having larger diameters. The fiber bundles are made by pulling fibers from a plurality of orifices in a fiberizing bushing, usually from tips, nozzles, on tip plates of a plurality of fiberizing bushings, while the material is in a molten or plastic state, cooling the fibers, coating the fibers with water or other cooling liquid medium such as glycols, and then with the sizing mixture usually containing one or more binding agents, gathering the fibers into strands, chopping the strands into segments of desired lengths, drying the wet chopped strands in an oven, and sorting the resultant dry bundles to remove undesirable small bundles and individual fibers, lumps and fuzz clumps. Typical processes are described in U.S. Pat. No. 3,996,032. These types of processes produce chopped strand bundles having a wide range of diameters and containing a wide range of numbers of filaments, e.g. from just a few fibers to 4000 or more fibers per segment. Many dry chopped strand products have been produced with the above-described processes and are used in making a wide variety of fiber reinforced products, but as described above, to achieve substantial improvement in bonding strength to the matrix, something different than the heretofore developed and proposed solutions is needed.

It has been documented that long fibers, with lengths typically more than 12 mm, provide reinforced products displaying improved physical properties, as reported by Thomason and co-workers (Composites A 1997, 28, 277 and Composites A 2002, 33, 1641). However, processing of long chopped glass fibers using standard equipment is not feasible due to the damage that the fibers would sustain under the high shear mixing and difficulties in dispersing of these long fiber bundles. In contrast, short fibers are easy to process and disperse, but they do not provide optimum properties within the composite materials.

It has been proposed to prepare an epoxy thermoset resin, which incorporates a woven continuous filament fabric, in which a sizing package including colloidal silica is applied to the woven fabric prior to the incorporation followed by vacuum assisted resin transfer molding. See, for instance, Army Research Laboratory Report No. ARL-TR-3241 (July 2004), and R. E. Jensen, S. H. McKnight, Composites Sci. Tech., Vol. 66, Pages 509 to 521 (2006). However, a long felt need still exists for overcoming current limitations of the sized reinforcing fibers to achieve better physical properties in the fiber reinforced polymer composite products.

SUMMARY

The present invention includes reinforcing fibers having particulate protuberances bonded directly to the surfaces of the reinforcing fibers, i.e. attached by physical and/or chemical bonds to the fiber surface, and method for forming such reinforcing fibers. The fibers can be any material including glass, glassy material, ceramic material, carbonaceous material, metal, natural or synthetic polymeric fibers, as well as other materials and mixtures thereof. The attached particles can be of any reasonable size, having a diameter of less than approximately twice the diameter of the fibers, and more typically having a diameter of less than that of the fiber and most typically are nano particles. The attached particles can be of any shape and typically are spheres, platelets, tubes, various crystal shapes including elongated and angular shapes. The particles can be any material that is compatible with the matrix and that will not significantly deteriorate during processing and the reasonable life of the product and typically includes glasses, metals, elements, and non-glass ceramics including oxides, carbides, nitrides, metals and/or their salts and other inorganic or organic compounds, alkali compounds, silicates, alloys, and mixtures thereof.

The fibers of the invention can be of any length. Short fibers of the invention, having lengths of less than about 12 mm can afford composites with strengths similar to those of conventional LFRP products and fibers of the invention having lengths greater than 12 mm can result in composite materials with toughness not yet experienced in high volume commercial products. The fibers of the invention can also be coated with various types of sizing compositions and can be in the form of previously utilized reinforcing fibrous products, including wet fibers, with or without a size coating other than a liquid, chopped into lengths, shipped in strands of any length or further processed by being pelletized, agglomerated, and packaged either wet or dried before shipping. The fibers can be in the form of rovings, mats, yarn, woven fabrics, preforms, or any other conventional fiber or strand form. A strand is a plurality of fibers gathered into a compact bundle with the fibers customarily contacting one another in a substantially parallel manner.

The method of the present invention comprises forming the fibers having particulate protuberances on the surfaces thereof prior to collecting of the fibers into a strand or strands. This is achieved by causing particles to bond to hot surfaces of the freshly drawn fiber or fibers, prior to the coating of the fibers with typical sizing materials or binders. One method involves directing one or more gaseous streams containing suspended particles onto the fibers while the surface of the fibers are still in a molten or otherwise tacky state and elevated temperature, causing the particles to physically and/or chemically bond to the surface of the fibers. Another method directs one or more streams of liquid containing suspended particles onto the fibers while the surfaces of the fibers are still in a molten or otherwise tacky state or at an elevated temperature, causing the liquid to evaporate and the particles to physically and/or to chemically bond to the surface of the fibers. Still another method comprises including particles in any conventional sizing, thus forming a chemical and/or physical bond between the nascent fibers and the particles during the sizing application and/or further processing steps like drying, pelletizing and agglomerating.

The particles may be selected from a group consisting of oxides, carbides, nitrides, metals and/or their salts, organometallic compounds, alkali metal salts, alkaline earth compounds, silicates, alloys, etc., or mixtures thereof. The particles commonly are selected which are compatible with the matrix that is to be reinforced. The particles can be irregularly shaped and can contain voids. Most typically, the particles are of a material that will not be broken down by the processing of the fibers following their attachment to the surfaces of the fibers. The particles can be angular, spherical, plate-like, elongated, etc.

One group of particles includes those materials that will flux or be fluxed by the hot surface of the fibers to form a glassy interface forming a strong bond between the fibers and the particles. For example, an alkali metal salt, or a particle coated with an alkali metal salt, will rapidly flux, and be fluxed, by the hot fiber producing a thin glassy interface with the hot fiber surfaces. Also, very fine particles, such as nano-sized particles or particles having a longest number average dimension of less than approximately 30 micrometers including amorphous silica, fumed silica, and similar surface-active particles may be utilized to advantage. Such particles can rapidly form bonds with the hot fibers, particularly when the surface of the fibers such as glass fibers is at a temperature exceeding approximately 1000° C.

The bonding can also be enhanced by preheating the particles, the gas carrying the particles, or both. For example, when the hot fibers are hot glass fibers, the particles and/or gas can be heated to several hundred ° C. or above, before striking the fibers. The fibers can be suspended in one or more gaseous streams using known techniques including those disclosed in U.S. Pat. Nos. 4,459,145, 4,475,936, and 4,778,502, the disclosures being incorporated herein by reference. When the particles are preheated with the hot gas, the temperature of the preheating will vary depending upon the nature of the particle material and the composition of the fibers taking into consideration the temperature which can be withstood in the absence of deleterious consequences. For example, when the fibers are of a polymeric composition, the temperature commonly will be much lower than when the fibers are glass or of a glassy material. The heating temperature should not be so great that the particles and/or fibers will be deteriorated or damaged.

The fibers of the present invention commonly are provided in average lengths of approximately 2 to approximately 250 mm. For instance, shorter lengths of approximately 2 to 12 mm (e.g., approximately 3 to 7 mm) or longer lengths greater than 12 up to approximately 250 mm (e.g. approximately 15 to 50 mm) can be utilized. Alternatively, the fibers can be of indefinite length, such as strands, rovings, etc.

The invention also includes a method for making moldable mixtures using fibers having particulate protuberances physically and/or chemically bonded to the surfaces thereof. The moldable mixtures include a matrix material, such as a thermoplastic polymer, thermosetting polymer, polymer precursor, ceramic forming material, asphalt, bitumen, metal, alloy, glass, glassy material, hydraulic setting material, and mixtures thereof, suitable for forming fiber reinforced or long fiber reinforced composite products. The method includes dispersing the fibers bearing the particulate protuberances in the matrix material through mixing. This method can also include forming the resultant mixture into pellets, a shape for molding, or into a finished molded fiber reinforced or long fiber reinforced composite product. The invention also includes the molded product containing the fibers having particulate protuberances within the matrix material. Such product can be formed through the use of standard molding techniques known in the art.

When forming a moldable mixture comprising the fibers of the present invention and a polymeric matrix material, regrind, recycle, and/or reclaim advantageously can be included. Such blending can be conducted in a compounder, extruder, or other suitable mixing equipment. Such recycle or reclaim can be fed downstream, before, with, or after the addition of the reinforcing fibers of the present invention.

In an embodiment comprising the formation a moldable mixture for use in the formation of long-fiber reinforced composite products the fibers of the present invention and the matrix material, such as a polymer or polymer precursor, along with other non-long fiber additives are fed into a heated plasticator (mixer, compounder or plasticizer) where they are mixed and are extruded. The fibers of the invention can be used with various types of equipment including extrusion equipment, injection molding equipment, blow molding equipment, compression molding equipment including shot pot/accumulator systems, reciprocating screw systems, as well as fixed screw systems.

Conventional matrix materials including thermoplastic polymers and polymer precursors and mixtures thereof used in fiber reinforced product systems can be used in the method of the present invention as well as most of the thermosetting polymeric materials used in sheet molding compounds (SMC) and bulk molding compounds (BMC). These include polyolefins (e.g., polyethylene and polypropylene), polyamides (e.g., Nylon 6, and Nylon 6,6), polyesters (e.g., polyethylene terephthalate and polybutylene terephalate), polycarbonates, polyacetals, styrenic polymers, polyethers, polyetheretherketones, urethanes, liquid crystal polymers, polybenzimidazoles, polyether sulfones, polyphenylene sulfides, and thermosetting polymers including their precursors. The thermosetting polymers and their precursors include, but are not limited to, unsaturated polyester, vinyl ester, phenolic, urethanes, epoxy resins, and modifications and/or mixtures thereof.

When the word "approximately" is used herein it is meant that the amount or condition it modifies can vary some beyond that as long as the advantages of the invention are realized. Practically, there is rarely the time or resources available to very precisely determine the limits of all of the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found having no further unexpected characteristics, the limits of those embodiments are within the meaning of the term "approximately" as used herein. It is not difficult for the artisan or others to determine whether such an embodiment is either as expected, or because of either a break in the continuity of results or one or more features that are significantly better than those reported by the inventor, is surprising and thus an unobvious teaching leading to a further advance in the art.

DESCRIPTION OF PREFERRED EMBODIMENTS

Figure 1:
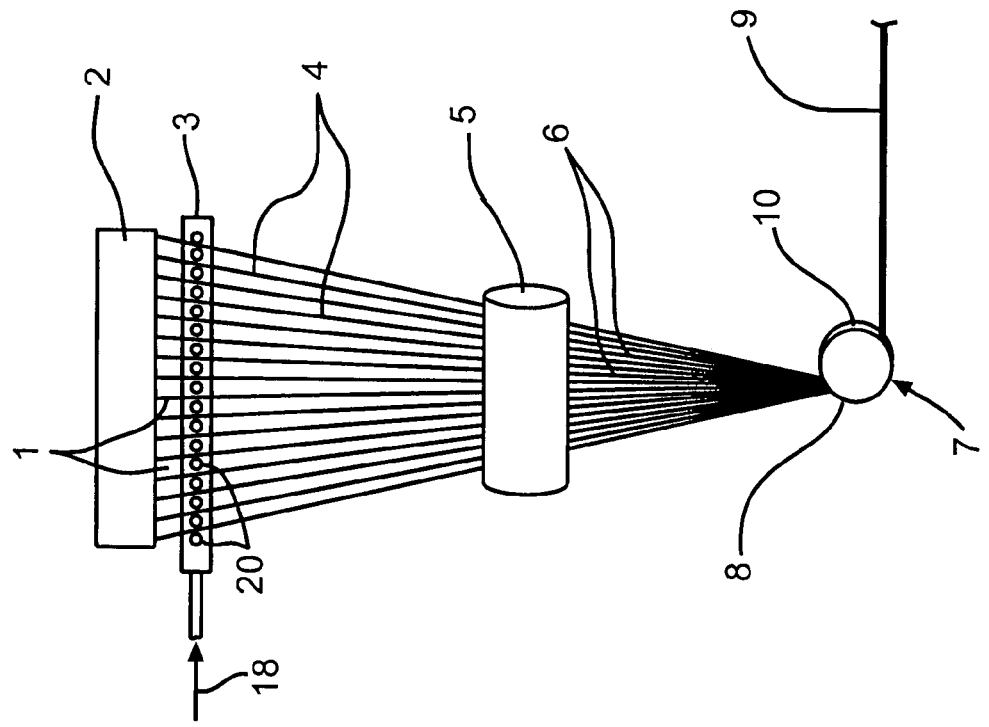
FIG. 1 is a partial schematic of a typical system for forming continuous reinforcing fibers from a molten material and showing an embodiment of the invention.

Typically, chopped fiber made and used in the invention will be at least approximately 3 mm long on average, but shorter fibers can be used. Longer chopped fibers can be as long as approximately 250 mm on average, with a more typical range being between approximately 7 mm and approximately 100 mm on average, most typical being in the range of approximately 12 mm to approximately 50 mm on average. The majority of the fibers in the chopped strands typically have diameters of from approximately 6 micrometers to approximately 50 micrometers on average, preferably from approximately 10 to approximately 23 micrometers on average, but other diameters may be suitable for some applications. Microfibers, with diameters less than approximately 6 micrometers also may be converted into the fibers of the present invention. Customarily, most of the fibers will be in a narrow range of fiber diameters and lengths, because this is how most reinforcing fiber products on the market are made, but this is not necessary as long as their lengths and their diameters can be tailored to meet specific applications. In roving, yarn and continuous strand mat and preform products the fiber length is not limited and the properties typically depend upon the tex, basis weight, and fiber diameter. In sheet molding compounds and chopped strand performs, the fiber lengths will usually be similar to chopped fiber strand products or longer.

The moisture or solvent content of the formed fiber strands may vary from 0.0 weight percent to about 20 weight percent, or more. Preferably, the moisture content is within the range of about 0.001 to about 10 percent, and most typically is less than about 2 percent as the fiber enters the conventional fiber reinforced product (FRP) manufacturing equipment. Chopped glass fibers and glass fiber rovings used in FRP processes are typically dried before molding, in processes such as shown in U.S. Pat. Nos. 4,158,555, 4,840,755 and 5,945,134 at the fiber manufacturer or at the customer site, but can also be fed into the extruder in the wet state.

Many types of fiber can be used in the present invention including all kinds of fibers made from different grades of glass including, but not limited to, E, S, C, D, R, and T, all kinds of ceramic fibers, all types of carbon and graphite fibers, all types of natural mineral fibers, natural organic fibers, natural and synthetic polymer fibers and all types of metal fibers. Glass fibers and carbon fibers are most commonly used in FRP products and are preferred in this invention. Mixtures of fibers can also be utilized.

Wet chopped glass fibers and strand products are available and are used in wet forming mat machines used to make non-woven fibrous mats, stampable sheet FRP products, and gypsum wall board products. The sizing compositions on some of these products may contain only one or two ingredients, e.g. U.S. Pat. No. 6,294,253. These wet products are usable in the invention as are other wet products containing more and/or different ingredients. It is preferred, but not necessary, that the sizing on the fibers of the chopped fiber products, the roving products, and the wet-laid mat or yarn products have at least one coupling agent, such as a silane, and at least one lubricant therein.

The roving and yarn products are made in a conventional manner except for the invention of bonding particles onto the fiber before the roving or yarn is wound into packages. They are then dried to remove the solvent or liquid carrier, normally water, and to cure the film former binder, and other components in the sizing. Also, the film former or binder ingredient(s) in the sizing composition coated on the fibers can be reduced or even eliminated entirely if desired. Products made on known roving processes can be used, such as those disclosed in U.S. Pat. Nos. 5,055,119, 5,605,757, 5,957,402, 6,349,896, 6,425,545, 6,568,623, and 6,780,468, the disclosures of which are hereby incorporated herein by reference.

FIG. 1 shows a typical fiberizing position in a fiber forming system that forms continuous fibers from a molten material. The fiberizing position comprises a fiberizing bushing 2 for converting molten material into fibers 1. Optionally, but typically, one or more conventional water spray manifolds 3 having spaced apart fine jet nozzles for spraying a fine mist of cooling water onto the hot fibers 4 to cool the fibers can be located a conventional distance below the bottom of the bushing. An optional, but typical, conventional sizing applicator 5 applies a sizing to the surfaces of the fibers 6. Other methods of sizing application, such as dipping or curtain coating may also be used. The sized fibers are then fed to a gathering shoe 7 of any type that gathers the array of the sized fibers 6 into a fiber strand 9 that is typically pulled by a conventional fiber chopper, a winder of any type (not shown) or any other strand pulling means. The bushing 2 typically comprises a plurality of nozzles or hollow tips on the bottom side through which the molten material flows in a known manner to form the fibers 4. The molten material forming the fibers is typically very hot, usually over about 1000 to 1227 C. or hotter, when the molten material is glass, but the temperature and can be lower or higher, depending on the actual material being fiberized. The molten material cools off during formation into fiber and further cools to below the solidification point of the glassy material at or near the end of the attenuation of the fiber and then cools further during the region extending about 50 cm or more below the bottom surface of the tips of the bushing, but is usually at an elevated temperature throughout this region. The sizing applicator 5 is located in the same or similar positions with respect to the bushing 2, which is typically in the range of about 50 cm or less to about 150 cm or more below the bottom of the bushing 2. These elements of the system are old as evidenced by U.S. Pat. Nos. 3,955,951, 3,905,790, 4,300,929, 4,321,074, 4,329,163, 4,362,541, 5,907,837, and 5,972,500, the disclosures of which are hereby incorporated by reference.

Small particles with a longest number average dimension of less than 0.01 nanometer to approximately 20 to 30 micrometers, or agglomerates of such particles of any size, are suspended in a gas, such as air, nitrogen, argon, carbon dioxide, other gases or mixtures thereof. The particles are suspended using a fluid including a compressed gas, forming a vortex, that picks up the particles and allows them to remain suspended in the fluid. This concept of suspending particles is known and utilized in the technology of forming powder coatings, and other technologies. The fluid can also include a liquid, preferably one that volatilizes easily in the hot environment in the region, preferably such that most or all of the liquid is volatilized before the suspended particles strike the surfaces of the fibers. The particles chosen must be of a material and size that will form a chemical and/or physical bond immediately with the hot surface of the hot fibers. Such materials include fumed silica and any other organic and/or inorganic compounds or their mixtures. The fluid, such as a gas 11 containing these suspended particles is then sprayed toward the molten or hot menisci and/or fiber surfaces allowing for the deposition of the particles on the fibers.

The gaseous suspension of particles 15 is blown into the fiber array 1 using nozzles 12 to strike the hot menisci and/or the hot fibers in the fiber array 1 in a region including the attenuation zone and a zone having a length of up to approximately 50 cm below the attenuation zone beneath the bushing 2. The particles are metered and fed into a gas stream at a rate amounting to a range of about 0.1 wt. percent to about 100 wt. percent of the rate that the fibers 1 are being produced. Not all of the particles will be bonded directly to the surface of the fibers 1, and those particles not bonding to the fibers can be collected and recirculated. The gas stream 11, or streams 11 and 13, containing suspended particles are fed to one or more nozzles 12, 14 for directing the gaseous suspension into the array of fibers 1 in the zones mentioned above.

Figure 4:
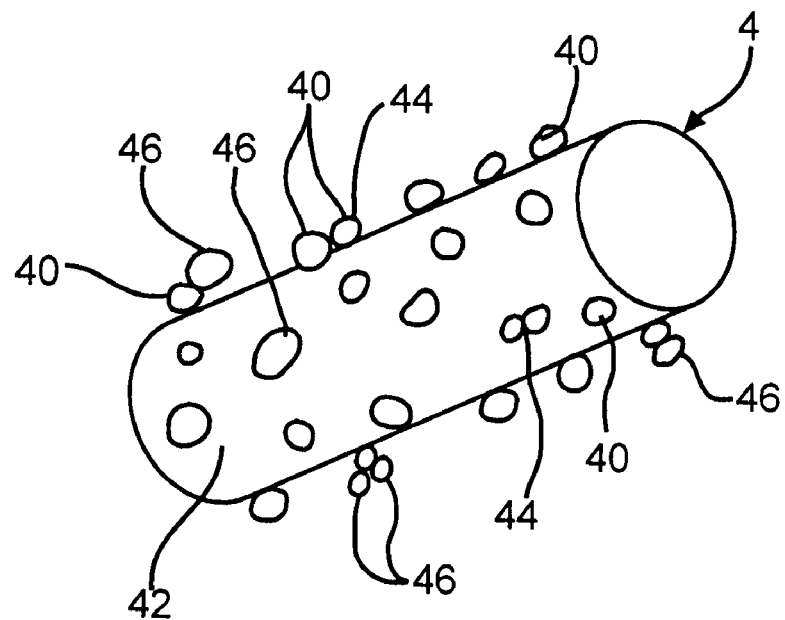
FIG. 4 is a greatly magnified perspective view of a short length of fiber in accordance with the present invention. Representative directly attached particulate protuberances are shown.
Figure 4A:
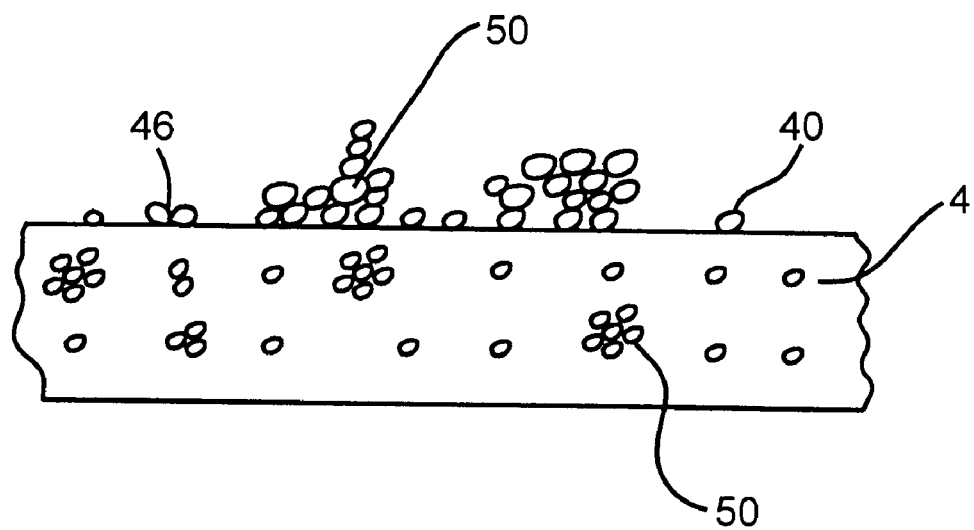
FIG. 4A is a greatly magnified perspective view of another short length of fiber in accordance with the present invention.

The fibers 4 and 6 of the invention have a rough protuberances on the surfaces due to the particles being bonded directly to the surfaces of the fibers 4, 6, as depicted in FIG. 4. As shown in FIGS. 4 and 4A the fibers 4 have particles 40 bonded directly to the surface 42 of the fiber 4, and sometimes to other particles 40 such as at 44. Also, some particles 46 are bonded to particles 40 or other particles 46 or both to form clumps 50 of particles 40, 46. These bonds may be physical and/or chemical, achieved by van der Waals forces, as well as covalent or ionic bonds or any other type of physical and/or chemical interactions that allow the particles to remain on the fiber surfaces. For simplification, only some of the particles 40 and 46 are shown in FIGS. 4 and 4A. Normally the fibers of the invention will have a density of particles 40 and 46 that provides the desired or preferred properties or surface effects.

A very thin, usually discontinuous and spotty, layer of sizing on fibers 6 is not shown in FIGS. 4 and 4A, but the sizing will at least partially coat not only the fiber surface 42, but also the surfaces of the particles 40 and 46 and the clumps 50 that are directly attached to the fiber surfaces. The addition of the particles to the fiber surface will significantly increase the surface area of the fiber, which, with the rough surface, will lead to increased adhesion area and improved toughness of the reinforced compounds and products made therefrom containing the fibers of the present invention. Hence, shorter fibers in accordance with the present invention commonly display surface areas larger or similar to traditional longer fibers and should provide composite properties currently available only with long-fiber reinforcements.

The fibers 4 of FIGS. 4 and 4a, have particles 40 bonded physically and/or chemically directly to the fiber surfaces 42 and particles 46 are bonded chemically and/or physically to the particles 40 and/or 46, forming clumps 50. These fibers 4 can be coated with any conventional sizing for the same purpose as any sizing and/or binder is applied to any fiber. The resultant sized fibers 6 (FIGS. 1 and 2) are then ready to be processed further in the conventional ways described below to make various types of reinforcing fiber compounds, moldable mixtures, mats, preforms, etc. and fiber reinforced composites or long-fiber reinforced composites of the invention described herein.

Figure 2:
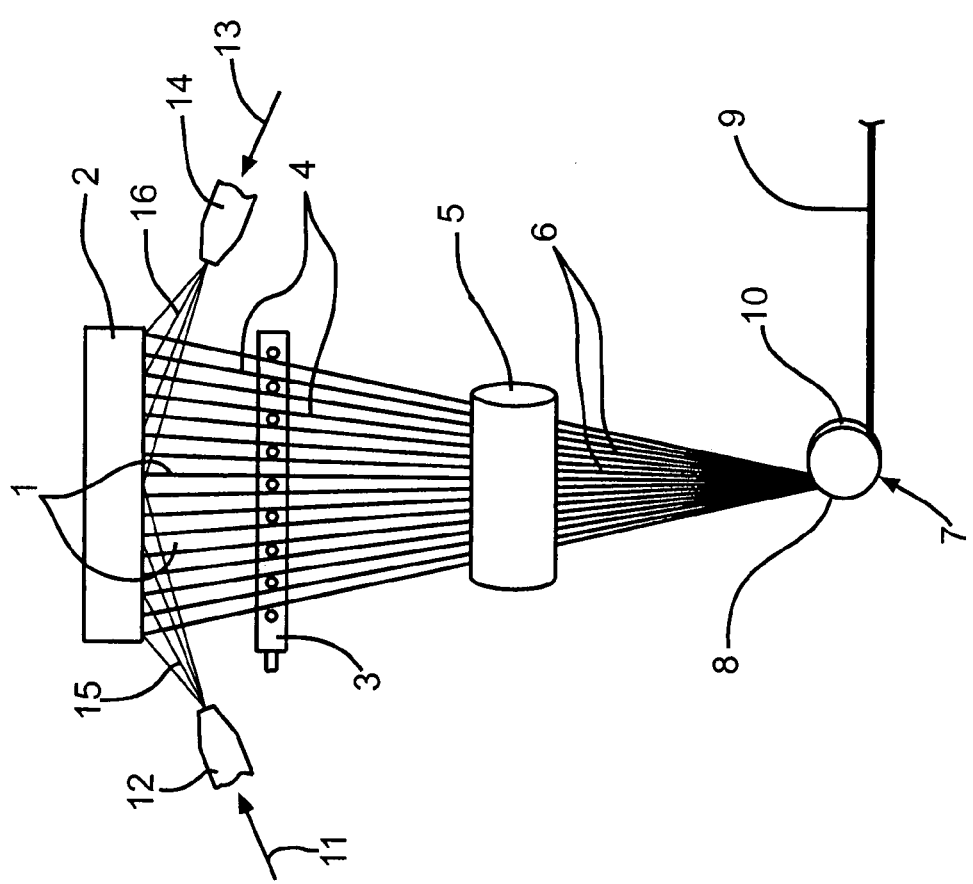
FIG. 2 is a partial schematic of the same system shown in FIG. 1 and shows another embodiment of the invention.

FIG. 2 shows another embodiment of the invention. In this embodiment, the manifold 3 is positioned so that a fine particle suspension or mist, generated with the jets 20, strikes the hot fibers 1 in the lower portion of or just below the attenuation zone and in the zone extending approximately 50 cm below the attenuation zone. Particles, described above are suspended in water or another liquid that will rapidly evaporate before and/or when striking the hot fibers allowing the suspended particles that directly strike the surface of the hot fibers 1 to form a physical and/or chemical bond with the surface of the fibers 1, producing the fibers 4 in accordance with the present invention. The fluid suspension 18 is metered to the manifold 3 having a concentration of particles to produce the particle to fiber ratio described in the earlier described embodiment. Fluids including liquids suitable for this embodiment include, but are not limited to water, alcohols, and any other solvent or solvent mixture capable of carrying the particles and allowing for their deposition on the fibers. A traditional sizing can be applied if desired with the applicator 5 to form sized fibers 6 wherein particulate protuberances were previously attached to the surfaces.

Any method used to suspend the particles in a gaseous fluid such as air or in a liquid fluid such as water can be used in the invention, but the method most typically used is presented hereafter. The constituents are added to the solvent under agitation. Dispersing of the particles in the liquid can be done under any conditions that provide the desired results, including mixing, sonically, by agitation, by shaking, or any other method. The order of addition is typically not critical; however, in some cases, it may be necessary to follow the prescribed addition order, as developed by those skilled in the art. In addition, in some instances pre-mixes of certain components may be required. The thus prepared liquid optionally can contain in some embodiments, in addition to the particles that will deposit on the fiber, some or all of the typical sizing components, such as a silane or silanes, film formers, lubricants, surfactants, biocides, colloidal silicas, and any other components. Suitable methods of suspending the particles in a gaseous fluid including a hot gaseous carrier are described earlier, and similar methods and equipment can also be used, with or without means for heating the gaseous carrier or particles.

Figure 3:
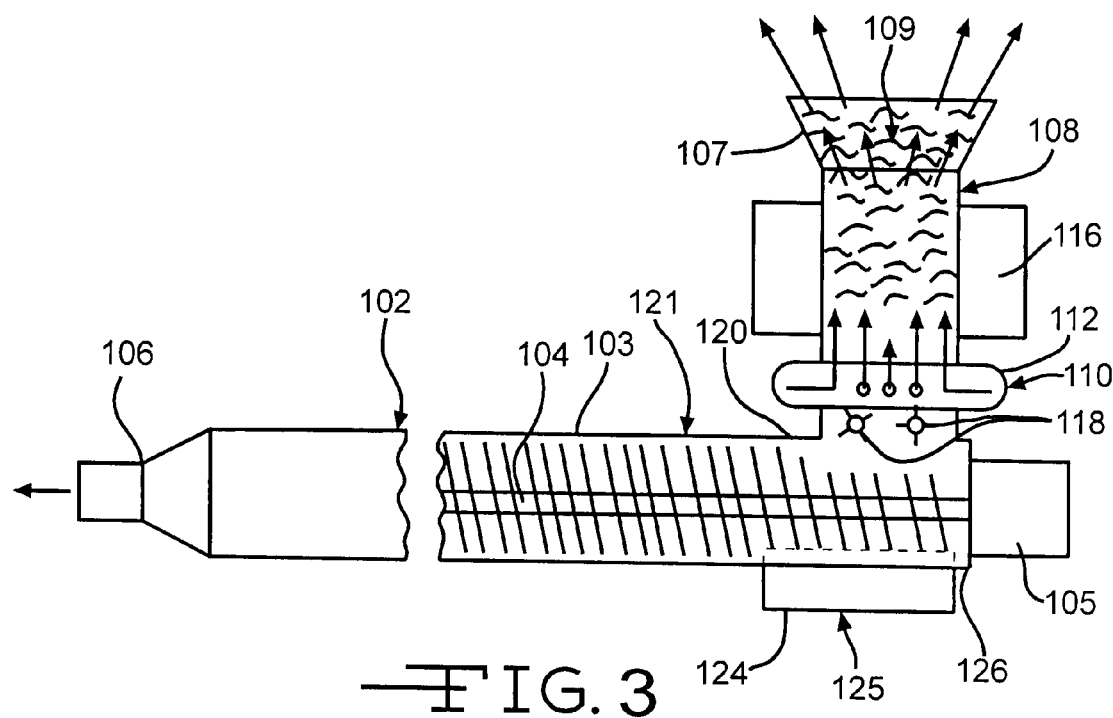
FIG. 3 is a schematic of an extrusion process for compounding the matrix material(s) with cropped fibers having particulate protuberances physically and/or chemically directly attached thereto according to the present invention.

FIG. 3 is a perspective cross section of a single or double screw (with the second screw hid behind the first screw) compounder 102 system comprising a body 103, a screw or screws 104, a drive 105 and an extrusion head 106 that can be used to produce moldable mixtures of one or more polymers, fillers, the reinforcing fibers in accordance with the present invention, and other additives. The compounder or extruders are well known and can be of various types. The compounder system shown also comprises a fiber feeder 108, such as a SolidsFlow® Model 7000 feeder available from the Schenck AccuRate® company of Whitewater, Wis., U.S.A., or a Brabender Special Fiber Feeder available from the Brabender Technologie of Mississauga, Ontario, Canada. These feeders will feed fiber 109 into the conventional compounder. In such an embodiment of the invention, the fiber is fed into the hot compounder to be combined with and dispersed in at least one hot polymer or polymer precursor that is fed into the compounder in a conventional manner. Venting through the fiber entrance or other vents in the compounder may be utilized as well. The hot polymer or polymer melt is typically in a range of approximately 150 to 450° C. when entering the mixer or compounder.

Optionally as shown in FIG. 3, the fiber feeder 8 can be modified to enable heating air 110 at a temperature of at least approximately 100° C., preferably in a range of approximately 150 to 500° C. or higher to be fed from a manifold 112, through spaced holes or preferably through a slot in the manifold. By communicating with the fiber, surrounding, or adjacent to a lower end of a vertical cylindrical portion 114 of the feeder 108, hot air preheats the fibers 109 in accordance with the present invention. An optional supplemental heater 116 that preferably is a coil carrying a hot fluid or other conventional heater, may surround at least a portion of the vertical cylindrical portion 114 of the feeder.

One or more optional agitators 118 can be positioned below the vertical cylindrical portion 114 above or in a fiber entrance 120 of the compounder 102. The agitators 118 can be of the shaft-and-pin type spaced apart so that the pins on the shaft almost contact each other and walls of the fiber entrance 120 so that the agitators 118 control the feed rate of the fibers having particulate protuberances physically or chemically attached directly to the surfaces into the body 103 of the compounder 102 and also prevent any bridging of the fiber in the fiber entrance 120. The preheating air 110 is preferably at a temperature, below which deterioration of any sizing or the fiber would take place. The desired polymer or polymer mixture 121 is fed into the compounder 102 in a conventional manner. Moldable mixtures 128 comprising one or more polymers and reinforcing fiber are extruded by the compounder 102 through various extrusion heads 106, either directly into conventional injection or other known molding systems to make fiber reinforced sheets and final profiles, or as moldable or stampable sheets or shapes that can be cut to desired size and molded in presses in a conventional manner.

The compounder 102 is normally heated in a conventional manner and the fiber, now dry or containing some water or solvent can be, but need not be, warm or hot when first contacting the polymer or polymer mixture 121 aiding in the wet out of the fibers. Other, more conventional systems for drying the fiber can be used prior to the fiber feeder 108. An optional hot air manifold 124 partially surrounding a portion of the length of the body 103 of the compounder 102, adjacent to the drive end, can be fed with hot air 125 that passes through holes in the compounder body 103 can be used instead of, or in addition to the manifold 112 and/or the heater 116 to preheat the fibers 109 in accordance with the present invention.

Figure 3A:
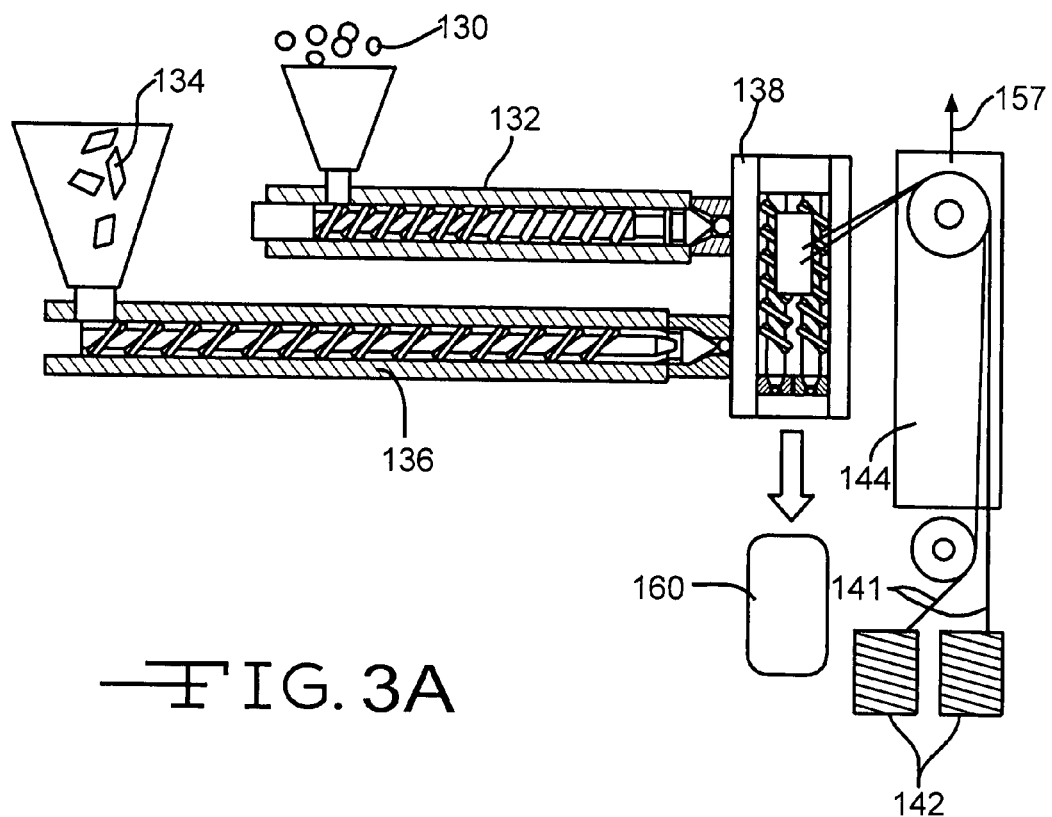
FIG. 3A is a schematic of an extrusion process for making moldable slugs containing the fibers in accordance with the present invention in the form of rovings.

FIG. 3A is a cross section of a two chamber extruder compounder that uses fiber roving in accordance with the present invention instead of or in addition to either conventional or chopped reinforcing fiber or chopped fiber strands in accordance with the present invention and is a modification of a system sometimes referred as the Dieffenbacher System, modified here for the use of fibers in accordance with the present invention. One advantage of using rovings in a compounder system is to place longer fibers into the resultant compound. Another advantage is the ease of handling roving packages and the rovings pulled therefrom.

In this modified system chopped strands of the subject fibers or chopped strands of conventional fibers and one or more polymers 30 and/or recycle polymer with or without fiber reinforcement are fed into a first compounder 132 in a known manner to disperse and wet out the fibers in the one or more polymers. To use chopped strands of fibers according to the present invention, the first compounder 132 is fitted with a fiber feeder/dryer 108 like that shown in FIG. 3 and/or with the preheater 125 also shown in FIG. 3. Optionally, recycle reinforced polymers or long fiber compounds 134 are fed into a second compounder 136. The compounder 136 can also be modified in the same manner as described above for the first compounder 132 to use chopped fiber strands according to the present invention.

The output of the first compounder 132, and optionally that of the second compounder 136, feed into a twin screw, third compounder 138 in a known manner. Part way into the third compounder 138, also in a known manner, roving fiber strands of fiber roving in accordance with the present invention 141 are fed into the compounder 138 where they are broken into long lengths by the twin screws, are dispersed, and are caused to wet out in the polymeric feed from the first compounder 132. The roving 141, from roving packages 142, can be fed into the compounder 138 in a conventional manner when volatilized by the hot material in the third compounder 138. Fiber reinforced molding intermediate products 160 of the invention are produced by the compounder 138, with or without the input of the optional second compounder 136. The rovings 141 can be optionally preheated in a single or multiple pass conventional convection oven 144 having an exhaust 157 or in any other manner.

The materials, methods and systems of the present invention can be used with a wide variety of fiber reinforced manufacturing systems including, but not limited to those developed and/or used by CPI, Dieffenbacher, Coperion, Berstorff, the fluidized bed powder coating systems, melt impregnation systems, wire coating systems, and other related systems.

Different embodiments employing the concept and teachings of the invention will be apparent and obvious to those of ordinary skill in this art and these embodiments are likewise intended to be within the scope of the claims. The inventors do not intend to abandon any disclosed inventions that are reasonably disclosed but do not appear to be literally claimed below, but rather intend those embodiments to be included in the broad claims either literally or as equivalents to the embodiments that are literally included.

We claim:

1. A method for forming reinforcing fibers having particulate protuberances physically and/or chemically attached directly to the surfaces of the fibers comprising converting a molten material comprising a material selected from a group consisting of glass, glassy material, ceramic material, carbonaceous material, metal, and polymeric material into fibers by extruding the molten material through orifices to form menisci, pulling a hot fiber from each meniscus through a region including an attenuation zone and a zone extending approximately 50 cm below the bottom of the menisci and contacting the hot fibers with a fluid having solid particles suspended therein while the hot fibers are in at least a portion of said region, wherein the particles adhere to the surfaces of the hot fibers and create protuberances thereon, the particles having a longest number average dimension within the range approximately 2 nanometers to approximately 30 micrometers.

2. The method of claim 1, wherein the fluid is a gas.

3. The method of claim 2, wherein the gas is air.

4. The method of claim 2, wherein the gas is heated.

5. The method of claim 3, wherein the air is heated.

6. The method of claim 1, wherein the surfaces of the hot fibers are tacky when contacted by the particles.

7. The method of claim 2, wherein the surfaces of the hot fibers are tacky when contacted by the particles.

8. The method of claim 3, wherein the surfaces of the hot fibers are tacky when contacted by the particles.

9. The method of claim 4, wherein the surfaces of the hot fibers are tacky when contacted by the particles.

10. The method of claim 5, wherein the surfaces of the hot fibers are tacky when contacted by the particles.

11. The method of claim 1, wherein the particles are suspended in a liquid prior to contacting the fibers.

12. The method of claim 1, wherein the particles are selected from a group consisting of oxides, carbides, nitrides, metals and/or their salts, organometallic compounds, alkali metal salts, alkaline earth compounds, silicates, alloys, and mixtures thereof.

13. The method of claim 1, wherein the particles have a number average diameter in the range of approximately 0.01 nanometers to approximately 30 micrometers.

14. The method of claim 12, wherein the particles have a number average diameter in the range of about 0.01 nanometer to about 30 micrometers.

* * * * *